Patented Feb. 21, 1933

1,898,570

UNITED STATES PATENT OFFICE

ERNST PFEFFER, OF FRANKFORT-ON-THE-MAIN-SCHWANHEIM, GERMANY, ASSIGNOR TO GENERAL ANILINE WORKS, INC., OF NEW YORK, N. Y., A CORPORATION OF DELAWARE

PROCESS OF PREPARING RESERVES UNDER DYESTUFFS OBTAINABLE BY OXIDATION ON THE FIBER

No Drawing. Application filed May 7, 1929, Serial No. 361,261, and in Germany May 15, 1928.

My present invention relates to a process of preparing reserves under dyestuffs obtainable by oxidation on the fiber. Hitherto it has been possible to reserve aniline black with vat dyestuffs by printing the material with alkaline vat dyestuffs mixed with a reducing agent. These printing colors require great quantities of the reducing agent being liable to cause white halos and, moreover, it is necessary for the fixation of the vat dyestuffs to steam the material for 5 minutes in a Mather-Platt apparatus. By this long steaming operation the vegetable fiber is considerably weakened.

Now I have found that aniline black can be reserved with vat dyestuffs by mixing them with cellulose esters or cellulose ethers or other thickening agents capable of being precipitated by alkali, such as mucilaginous substances, for instance carrageen, either alone or in the presence of starch, flour or similar thickenings, adding reserving agents, such as sodium bisulfite, sodium acetate, zinc oxide or the like and printing the material with the colors thus obtained.

The non-reserved aniline black is first developed in the usual manner by steaming the material for a short time and the vat dyestuffs are fixed by subsequently treating the material in an alkaline hydrosulfite bath and finally steaming it for a short time.

The following example illustrates the invention:

The reserves are either printed on the white material which is subsequently prepared with a solution of an aniline black preparation or the printing colors mentioned hereafter are printed on the material previously prepared with aniline black:

| White reserve | Colored reserve |
|---|---|
| 600 g. of thickening M<br>180 g. of sodium bisulfite of 36° Bé.<br>170 g. of water<br>50 g. of zinc acetate<br><br>1000 g. | 100 g. of the yellow vat dyestuff prepared according to U. S. Pat. No. 1,564,584 of December 8, 1925<br>600 g. of thickening M<br>100 g. of acetic acid 50%<br>200 g. of sodium acetate<br><br>1000 g. |

*Thickening M*

75 g. of methylcellulose are added to
925 g. of hot water
———
1000 g.

The methyl cellulose dissolves in the water when the mixture cools down.

*Solution of aniline black*

84 g. of aniline salt
5 g. of aniline oil
10 g. of tragacanth 60:1000
30 g. sodium chlorate
54 g. of yellow potassium ferrocyanide
777 g. of water
———
1000 g.

After the material has been printed it is steamed for one minute in the Mather-Platt apparatus at 95° C. to 98° C., padded in the hydrosulfite bath given below, directly steamed in a roller box for 15 seconds at 98° C., rinsed cold, acidified, chromed with 2 g. of potassium bichromate per liter and finally rinsed.

*Hydrosulfite bath*

100 g. of hydrosulfite concentrated powder
747 g. of cold water
150 ccm. of caustic soda solution of 40° Bé.
3 g. of a wetting agent
———
1000 g.

I claim:

1. The process of producing reserves on aniline black grounds, which comprises applying as a printing reserve a composition comprising a vat dyestuff, a resist of the class consisting of sodium bisulfite, sodium acetate and zinc-oxide and a thickening agent capable of being precipitated by an alkali, developing the aniline black on the non-reserved ground by shortly steaming the material, and thereupon fixing the vat dyestuff on the reserved parts by treating the material in an alkaline hydrosulfite bath, and subsequently steaming and finishing the material thus treated.

2. The process of producing reserves on aniline black grounds, which comprises applying as a printing reserve a composition comprising a vat dyestuff, a resist of the class consisting of sodium bisulfite, sodium acetate and zinc-oxide and a thickening agent capable of being precipitated by an alkali mixed with another thickening agent, developing the aniline black on the non-reserved ground by shortly steaming the material, and thereupon fixing the vat dyestuff on the reserved parts by treating the material in an alkaline hydrosulfite bath, and subsequently steaming and finishing the material thus treated.

3. The process of producing reserves on aniline black grounds, which comprises applying as a printing reserve a composition comprising a vat dyestuff, a resist of the class consisting of sodium bisulfite, sodium acetate and zinc-oxide and as a thickening agent an organo-oxy derivative of cellulose capable of being precipitated by an alkali, developing the aniline black on the non-reserved ground by shortly steaming the material, and thereupon fixing the vat dyestuff on the reserved parts by treating the material in an alkaline hydrosulfite bath, and subsequently steaming and finishing the material thus treated.

4. The process of producing reserves on aniline black grounds, which comprises applying as a printing reserve a composition comprising a vat dyestuff, as a resist sodium bisulfite and as thickening agents an organo-oxy derivative of cellulose capable of being precipitated by an alkali and starch, developing the aniline black on the non-reserved ground by shortly steaming the material, and thereupon fixing the vat dyestuff on the reserved parts by treating the material in an alkaline hydrosulfite bath, and subsequently steaming and finishing the material thus treated.

5. The process of producing reserves on aniline black grounds, which comprises applying as a printing reserve a composition comprising a vat dyestuff, a resist of the class consisting of sodium bisulfite, sodium acetate and zinc-oxide and as a thickening agent a cellulose ether capable of being precipitated by an alkali, developing the aniline black on the non-reserved ground by shortly steaming the material, and thereupon fixing the vat dyestuff on the reserved parts by treating the material in an alkaline hydrosulfite bath, and subsequently steaming and finishing the material thus treated.

6. The process of producing reserves on aniline black grounds, which comprises applying as a printing reserve a composition comprising a vat dyestuff, as a resist sodium bisulfite and as thickening agents a cellulose ether capable of being precipitated by an alkali, and starch, developing the aniline black on the non-reserved ground by shortly steaming the material, and thereupon fixing the vat dyestuff on the reserved parts by treating the material in an alkaline hydrosulfite bath, and subsequently steaming and finishing the material thus treated.

7. The process of producing reserves on aniline black grounds, which comprises applying as a printing reserve a composition comprising a vat dyestuff, a resist of the class consisting of sodium bisulfite, sodium acetate and zinc-oxide and as a thickening agent methyl cellulose soluble in cold water and capable of being precipitated by an alkali, developing the aniline black on the non-reserved ground by shortly steaming the material, and thereupon fixing the vat dyestuff on the reserved parts by treating the material in an alkaline hydrosulfite bath, and subsequently steaming and finishing the material thus treated.

8. The process of producing reserves on aniline black grounds, which comprises applying as a printing reserve a composition comprising a vat dyestuff, a resist of the class consisting of sodium bisulfite, sodium acetate and zinc-oxide and as a thickening agent methyl cellulose soluble in cold water and capable of being precipitated by an alkali mixed with another thickening agent, developing the aniline black on the non-reserved ground by shortly steaming the ground, and thereupon fixing the vat dyestuff on the reserved parts by treating the material in an alkaline hydrosulfite bath, and subsequently steaming and finishing the material thus treated.

9. The process of producing reserves on aniline black grounds, which comprises applying as a printing reserve a composition comprising a vat dyestuff, as a resist sodium bisulfite and as thickening agents methyl cellulose soluble in cold water and capable of being precipitated by an alkali and starch, developing the aniline black on the non-reserved ground by shortly steaming the ground, and thereupon fixing the vat dyestuff on the reserved parts by treating the material in an alkaline hydrosulfite bath, and subsequently steaming and finishing the material thus treated.

In testimony whereof, I affix my signature.

ERNST PFEFFER.